Aug. 20, 1935. N. A. CLARKE 2,011,850
BICYCLE SIGNALING DEVICE
Filed Oct. 18, 1934
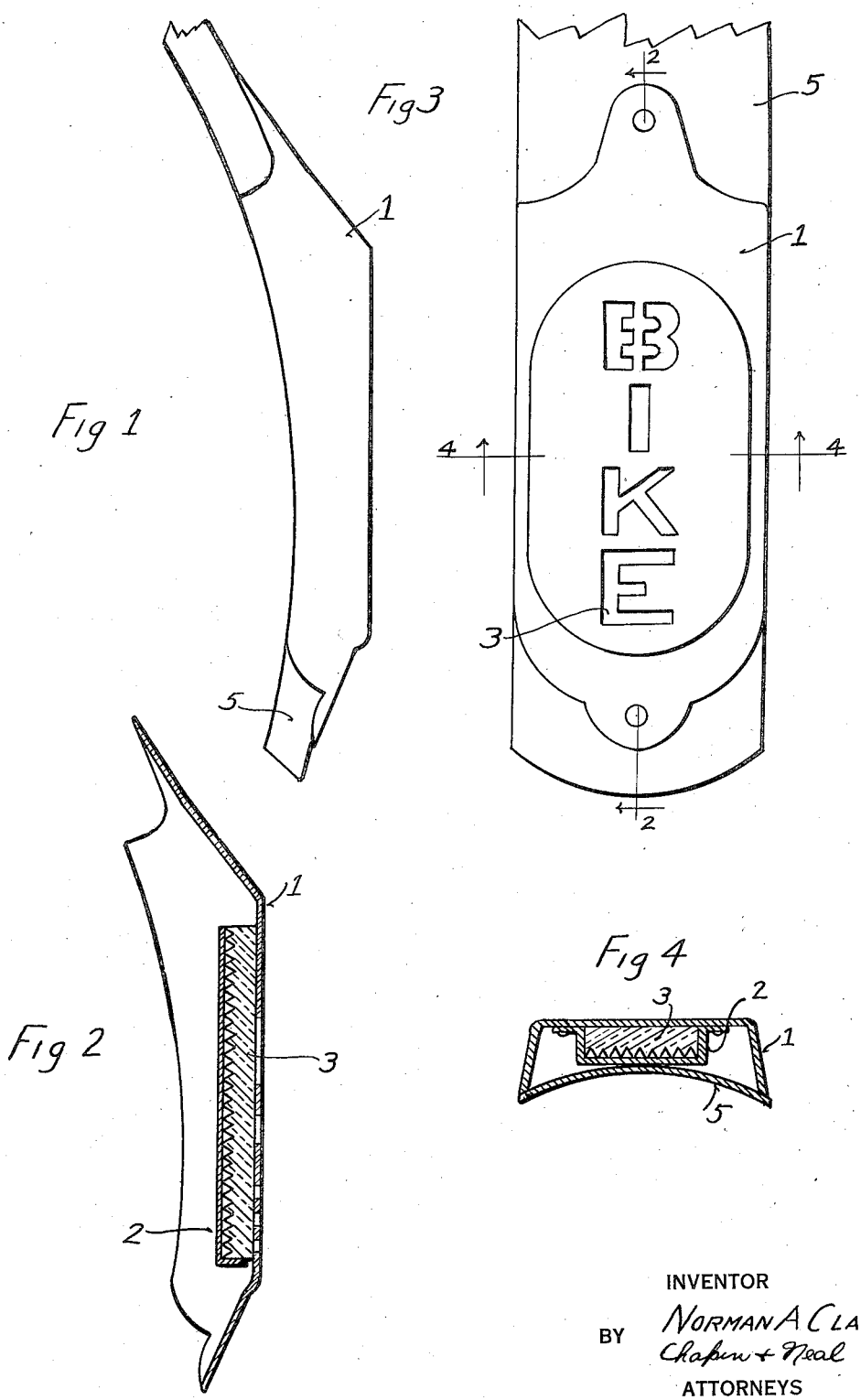
INVENTOR
*Norman A Clarke*
BY *Chapin + Neal*
ATTORNEYS Patented Aug. 20, 1935

2,011,850

UNITED STATES PATENT OFFICE 2,011,850

BICYCLE SIGNALING DEVICE

Norman A. Clarke, Westfield, Mass., assignor to The Westfield Manufacturing Company, Westfield, Mass., a corporation of Massachusetts Application October 18, 1934, Serial No. 748,875

1 Claim. (Cl. 40—135)

This invention relates to an improved species of rear light signaling means for bicycles.

The kind commonly used is a piece of red glass molded like a jewel, with its rim set in a frame mounted near the end of the rear mudguard. It reflects light to give the signal.

A difficulty with the common form is that the glass breaks in its frame and falls out. The bicycle user does not usually replace it, and one reason is that there are few service stations for bicycles. Ordinarily a bicycle user needs to get replacement parts from the factory and boys do not bother to do that. Even very large sporting goods stores that sell a great many bicycles do not provide for repairs and replacements. The items are too small and the burden of this situation is thrown back on the bicycle manufacturer.

The object of my invention is to provide a rear signal construction that will continue to function even though the glass is badly broken. As a further object, the construction is made so that with the glass badly smashed it will not show sufficiently to give the smashed appearance. The parts of the glass are held together so that it will not only continue to function but also retain its original decent appearance.

In the preferred form, I accomplish this object as follows. I use a known kind of colored signal glass that is perfectly smooth on one side. On the other side it is roughened with cone-shaped projections having hexagonally defined bases touching one another. Each cone is about an eighth of an inch at the base and about that in height. With this glass construction, a crack or break will always occur in a zigzag line along the path of least resistance. This path is one bordering the hexagonal bases, but never all the way around a single projection. I enclose a piece of this glass in a box frame of sheet metal. Or for convenience I wrap the glass with a metal covering tightly enough so that if the glass is cracked or smashed the parts are held in place. Of course the metal covering must have openings for light rays to reach the glass and be reflected. The cones break up the light rays to make the glass sparkle. According to my invention I make these light ray openings through that side of the metal box side which bears against the flat side of the glass, and I make the openings small enough so that particles of broken glass will not pass through. A good way to do this is to make stencil openings in the metal to spell a word, such as "Bike."

I will illustrate the preferred form in the accompanying drawing.

Fig. 1 is a view of the signal construction as it appears on the rear mudguard of the bicycle;

Fig. 2 is a cross-section on line 2—2 of Fig. 3;

Fig. 3 is a plan view of Fig. 1; and

Fig. 4 is a section on line 4—4 of Fig. 3.

For convenience I have made the casing 1 out of a single sheet metal stamping and a strap-shaped metal piece 2 with an inturned lower end. When fastened to the casing, the strap holds the glass plate 3 with its flat side tightly pressed against the flat inner side of stamping 1. When the latter is fastened on the rear bicycle mudguard 5 the glass is entirely shut out from all light rays except those through the stencil-like openings spelling the word "Bike." The drawing is substantially full scale.

With this construction, assume that a smashing blow hits the rear signal on a bicycle and the glass plate within breaks badly. The glass wrapping holds it in place against its tendency to scatter. The broken pieces, unless pulverized, are ordinarily too large to pass through any of the openings spelling the word "Bike." So the broken pieces will be held in place. A great many light rays can pass through the many openings in the casing to the glass and the latter, even when broken, will reflect them and give the sparkle for signal purposes.

The character of openings in the glass gives the advantage that dirt cannot readily close them up. And the spelling of a signal word in the casing cut-outs has advantages in two ways: it gives the character of openings desired, and it gives the best appearance.

The result is that bicycles, when furnished by the manufacturer with my species of signals on them, can now be widely distributed to the trade without losing their rear signals after their first glass smashing accident.

Having disclosed my invention, I claim:

A rear signaling device for bicycles which comprises a casing having a flat portion, side flanges extending rearwardly from the flat portion and adapted to engage the sides of the mud guard of the bicycle, and end portions sloping gradually from the flat portion into substantially smooth juncture with the face of the mud guard, a strap member, having side and bottom flanges, secured to the inner side of the flat portion of the casing and forming therewith a pocket, a glass reflecting plate, having a smooth flat front face and provided on its rear face with integral cone-shaped projections having polygonal bases contiguous to each other, positioned tightly in said pocket with its flat front face against the flat portion of the casing, the walls of the pocket preventing displacement of the parts of the plate if the latter becomes broken, and openings formed in the flat portion of the casing to admit light to the reflecting plate, said openings being sufficiently narrow to prevent escape of portions of the plate therethrough upon breaking of the glass along the normal lines of fracture defined by the bases of the projections.

NORMAN A. CLARKE.